United States Patent [19]
Okinaka et al.

[11] 4,222,996
[45] Sep. 16, 1980

[54] PREPARATION OF GOLD CYANIDE

[75] Inventors: Yutaka Okinaka, Madison; Lawrence E. Smith, Plainfield, both of N.J.

[73] Assignee: Bell Telephone Laboratories, Incorporated, Murray Hill, N.J.

[21] Appl. No.: 80,993

[22] Filed: Oct. 1, 1979

[51] Int. Cl.³ .............................................. C01C 3/08
[52] U.S. Cl. .................................................. 423/371
[58] Field of Search .............. 204/46 G; 423/371, 28, 423/29, 30, 31

[56] References Cited
U.S. PATENT DOCUMENTS

| | | | |
|---|---|---|---|
| 3,180,705 | 4/1965 | Freedman | 423/29 |
| 3,598,706 | 8/1971 | Freedman et al. | 423/371 X |
| 3,989,800 | 11/1976 | Gansinger | 423/371 X |

*Primary Examiner*—G. L. Kaplan
*Attorney, Agent, or Firm*—Walter G. Nilsen

[57] ABSTRACT

A synthesis of gold (I) cyanide is described which exhibits high yields and does not yield toxic gases (e.g., HCN). Gold (I) cyanide is important as a source of gold for gold plating baths. A synthesis of AuCN that does not involve evolution of toxic gases (e.g., HCN) is highly advantageous because no disposal problem is involved and the procedure is simpler and more straightforward.

19 Claims, No Drawings

PREPARATION OF GOLD CYANIDE

TECHNICAL FIELD

This invention relates to a method of synthesizing gold (I) cyanide.

BACKGROUND OF THE INVENTION

Increasing demand for the use of gold in various applications including micro-electronic circuits and electrical contact devices has renewed interest in gold plating technology. Both electroless and electroplating gold are of importance. In particular, the procedure for making gold compounds useful in gold plating technology is of major concern. Gold cyanide is useful in gold plating technology in a variety of ways, including replenishment of plating baths. This compound is particularly advantageous in this application because its addition to plating baths does not alter salt concentration. This permits replenishment of a gold plating bath without excessive increase in pH and the concentration of alkali-metal ion and cyanide ion.

Generally, AuCN is prepared by the acidification of $KAu(CN)_2$. However, this process generates highly toxic HCN gas which requires special handling and treatment before disposal. Similarly, other methods available for the manufacture of AuCN liberate toxic gases. For example, the precipitation of a solution of $AuCl_3$ with KCN liberates the highly poisonous cyanogen gas $(CN)_2$. Consequently, it is highly desirable, for commercial and safety reasons, to be able to prepare AuCN without evolving toxic gases. It is also desirable to minimize loss of gold. Thus, high yield (close to 100%) is desirable and the AuCN formed should be relatively pure. In addition, process simplicity and low cost are desirable.

SUMMARY OF THE INVENTION

The invention relates to a method of making gold (I) cyanide. It is to be observed that the present invention provides a novel method for producing gold (I) cyanide without evolving toxic by-products.

Although the procedure for making AuCN from metallic gold is quite involved, the important steps involve addition of approximately stoichiometric amounts of cyanide ion to a solution which is a source of monovalent gold (monovalent gold source solution) followed by reduction of the pH of the solution to less than about three to precipitate the AuCN. The monovalent gold source solution may be a solution of monovalent gold or a solution with gold (I) and gold (III) in equilibrium. Often, the solution is made from a solution with trivalent gold to which a reducing agent is added. Often, the monovalent gold is not formed until acidification. A typical procedure involves dissolution of metallic gold in aqua regia, dilution with water, addition of alkaline agent to make the solution alkaline and then addition of reducing agent to yield an equilibrium solution of trivalent gold and monovalent gold.

Particular advantages of this procedure are high yield and absence of toxic gases in the reaction product. Considering the high cost of gold, high yield is economically advantageous. Freedom from toxic gases eliminates disposal problems and simplifies reaction procedure.

DETAILED DESCRIPTION

This invention is a method for manufacturing gold (I) cyanide. Basic to the process is the addition of essentially stoichiometric amounts of cyanide ion to a gold solution which contains or acts as a source of monovalent gold, followed by acidification to precipitate the AuCN.

For completeness, it is convenient to describe the synthesis of gold cyanide starting with metallic gold. It should be recognized that often the gold will be supplied in a much more convenient form such as solution of trivalent or monovalent gold. First, the metallic gold should be converted to some soluble form. This may be done by a variety of procedures well known in the art. A particularly convenient procedure is to dissolve the metallic gold in aqua regia (generally made up of three parts hydrochloric acid and one part nitric acid). A solution of nitric acid with HBr or HI may also be used. This results in a solution of trivalent gold. This solution is then filtered to insure removal of all solid foreign matter. The gold chloride solution is then diluted with water so as to reduce the acid concentration of the aqua regia. Typical dilutions are approximately 50–70 milliliters of solution per gram of gold. Under these conditions, the pH of the solution should be in a range between 0.8 and 1.4. Variations outside of this range generally are not important.

The gold chloride solution is then made alkaline by the addition of suitable basic agents. Typically, a solution of alkali-metal hydroxide is used, such as one molar KOH solution. Sufficient basic solution is added so as to make the pH in a range suitable for the reducing agent used. Often, the resulting solution after addition of reducing agent to the trivalent gold solution is an equilibrium solution containing both monovalent gold and trivalent gold. Preferred reducing agents quantitatively convert trivalent gold to monovalent gold either before or after acidification. Also, a pure solution of monovalent gold may be used at this point.

A variety of procedures can be used to cause reduction of trivalent gold to monovalent gold. It should be realized that the reduction of monovalent gold might not be complete until acidification and after addition of cyanide ion. The reducing agent alkali-metal sulfite (generally sodium sulfite) is preferred because of ease of use and completeness of the reaction after acidification. Where sodium sulfite is used as a reducing agent, the pH should be of the range from 8 to 14 with 12–13.5 preferred, and 12.9–13.1 optimum. The more optimum pH range insures complete reduction after acidification without formation of metallic gold.

The reducing agent may be added in a variety of forms including aqueous solution and crystalline solid. The amount added is sufficient to insure complete reduction of the gold to monovalent gold with about 0–5 percent excess preferred to take care of various errors as for example in weighing. Typically, aproximately 0.704 grams of sodium sulfite are added per gram of dissolved gold. It is preferred that the reaction be carried out at room temperature, both for convenience and to insure that the reduction stops at monovalent gold and does not continue to metallic gold.

It should be emphasized that this solution of monovalent gold (either in equilibrium with trivalent gold or in pure form) may be produced in a variety of ways and that the above is only typical. For example, a pure solution of monovalent gold (without reducing agent) may be used.

Many other reducing agents may be used, but care must be taken that reduction of the trivalent gold to the monovalent gold should be complete (at least after acidification) without reduction to metallic gold. This limits the selection of reducing agent and determines the conditions (pH, temperature, etc.) of the reduction reaction. Typical useful reducing agents are nitrite ion ($NO_2^-$), thiosulfate ion ($S_2O_3^=$), hypophosphite ion ($H_2PO_2^-$), hydrazine ($N_2H_4$), formaldehyde and other aldehydes.

A critical part of the procedure is the formation of gold cyanide (AuCN) by the addition of cyanide ion. The pH of the solution is not critical, other than it be in the alkaline range (greater than 7). Generally, it is convenient to leave the pH the same as that obtained after the addition of reducing agent provided it is alkaline. For the sulfite reduction described above, the pH is nearly unchanged or reduced perhaps about 0.1. Any convenient source of cyanide ion may be used, but an alkali-metal cyanide such as KCN is most convenient. Although best results are obtained where stoichiometric amounts of cyanide ion are added, large variations, typically, up to approximately ±10 percent are tolerable. Variations from stoichiometric amounts either reduce yield (for too little cyanide ion) or result in the production of HCN gas (for too much cyanide ion). For best results, the exact stoichiometric amount of cyanide ion and up to 5 percent excess or even better, one percent excess should be used. This insures complete formation of the gold cyanide without formation of excessive hydrogen cyanide on acidification. Generally, the excess amounts are used to take care of any possible errors in weighing of chemicals.

In order to precipitate gold (I) cyanide, the solution must be acidified. To insure maximum yield, it is preferred that the pH be reduced to the range between 2 and 4. Best results in terms of yield are obtained in the pH range of between 2.2 and 3.0, with the range 2.2–2.3 most preferred. Any acid reagent may be used, provided the pH can reduce to the desired range without excessive use of the reagent. In addition, the acid reagent should not react with gold cyanide (e.g., reduction or oxidation of gold). Typical acid reagents are hydrochloric acid, sulfuric acid and nitric acid. Particularly convenient is a one molar solution of aqueous hydrochloric acid.

It is preferred that the acid reagent be added slowly generally less than one milliliter per minute per gram of gold. Sufficient acid is added so as to reduce the pH to the range set forth above. Generally, this is from 9–15 milliliters of one molar HCl per gram of gold. Optionally, a coagulent may be used before collecting the gold cyanide. Typical coagulents are ammonium carbonate, ammonium nitrate, and ammonium sulphate. Ammonium carbonate is preferred because it is gasified when the product is dried and leaves no contaminant.

After collecting the precipitated gold cyanide, the precipitate may be washed in pure (de-ionized) water and dried.

What is claimed is:

1. A process for making gold (I) cyanide from an aqueous alkaline gold solution capable of yielding gold (I) ions with pH in the alkaline range characterized in that the process comprises the steps of
   (a) adding to an aqueous gold alkaline solution capable of yielding gold (I) ions an amount of cyanide ion which is within 10 percent of the stoichiometric amount for the formation of a gold (I) cyanide resulting in a gold cyanide solution;
   (b) acidifying the resulting gold cyanide solution to a pH between 2 and 4.

2. The process of claim 1 in which the amount of cyanide ion ranges between the stoichiometric amount and 5 percent excess of the stoichiometric amount.

3. The process of claim 2 in which the resulting gold cyanide solution is acidified to a pH of 2.2–3.0.

4. The process of claim 3 in which the resulting gold cyanide solution is acidified to a pH of 2.2–2.3.

5. The process of claim 4 in which the resulting gold cyanide solution is acidified with a strong acid selected from the group consisting of hydrochloric acid, sulfuric acid and nitric acid.

6. The process of claim 5 in which the resulting gold cyanide solution is acidified with one molar hydrochloric acid and the acid is added at a rate less than one milliliter per minute per gram of gold.

7. The process of claim 1 in which the aqueous alkaline gold solution capable of yielding gold (I) ions has a pH between 8 and 14.

8. The process of claim 7 in which the pH ranges between 12 and 13.5.

9. The process of claim 8 in which the pH is between 12.9 and 13.1.

10. The process of claim 1 in which after acidification of the resulting gold cyanide solution, the precipitate of AuCN is separated and washed with water.

11. The process of claim 1 in which the aqueous alkaline gold solution capable of yielding gold (I) ions is made by adding reducing agent to an aqueous solution of gold (III).

12. The process of claim 11 in which the reduction is carried out with sulfite ion.

13. The process of claim 12 in which the reduction is carried out with sodium sulfite.

14. The process of claim 13 in which the reduction is carried out in a solution with pH between 8 and 14.

15. The process of claim 14 in which the pH is between 12 and 13.5.

16. The process of claim 15 in which the pH is between 12.9 and 13.1.

17. The process of claim 11 in which the solution of gold (III) is made by dissolving metallic gold in aqua regia, diluting the resulting solution and then adjusting the pH with an alkaline agent.

18. The process of claim 1 in which a coagulent is used in the resulting gold cyanide solution.

19. The process of claim 18 in which the coagulent is selected from the group consisting of ammonium carbonate, ammonium nitrate and ammonium sulfate.

* * * * *